United States Patent

Parenti

[15] 3,648,533

[45] Mar. 14, 1972

[54] TORQUEMETER REDUCTION GEAR

[72] Inventor: Giorgio Parenti, Parma, Italy

[73] Assignee: Siai-Marchetti S.p.A., Varese, Italy

[22] Filed: Mar. 26, 1970

[21] Appl. No.: 23,065

[30] Foreign Application Priority Data

Mar. 29, 1969 Italy.................................14819 A/69

[52] U.S. Cl..............................74/410, 74/411, 74/424.5, 74/427

[51] Int. Cl.........................................F16h 57/00, F16h 1/18

[58] Field of Search.........................74/424.5, 427, 409–411

[56] References Cited

UNITED STATES PATENTS

| | | | |
|---|---|---|---|
| 3,034,369 | 5/1962 | Marchand | 74/410 |
| 2,386,367 | 10/1945 | Taylor | 74/410 |
| 2,825,247 | 3/1958 | Haworth et al. | 74/411 X |
| 2,899,822 | 8/1959 | Matthews | 74/411 X |
| 2,995,046 | 8/1961 | Mansachs | 74/411 X |
| 3,126,753 | 3/1964 | Leach | 74/424.5 X |
| 3,292,457 | 12/1966 | Horowitz | 74/411 X |

Primary Examiner—Arthur F. McKeon
Attorney—Kurt Kelman

[57] ABSTRACT

A reduction gear including a pair of helical parallel gears, the driven gears being integral with a shaft axially movable within a hydraulic cylinder, the pressure of fluid being proportional to the power transmitted.

5 Claims, 2 Drawing Figures

INVENTOR.
GIORGIO PARENTI

TORQUEMETER REDUCTION GEAR

The present invention relates to a reduction gear for aeronautical use, and in particular for the transmission of motion from a motor to the rotor of helicopters and similar which comprises a torquemeter, i.e., a torque measuring unit, suitable for continuous signalling by means of a conventional indicator instrument the torque transmitted through said reducer gear.

Conventionally, reduction gears associated with torquemeters are known in the art, in particular for couplings with turbines for aeronautical use. For instance, one of said means comprises an epicyclical stage entraining planetary gears restrained with planetary gear holder. Said planetary gears will react on the crown, which latter is restrained with the base through helical groove. Owing to said restraint, the tangential loading on the crown will imply an axial component, which latter in turn is supported by means of a hydraulically controlled piston. Balancing of said axial thrust is governed through a distributing unit actuated by said thrust piston, while the differences in pressure are detected by means of a suitable instrument which indicates the torque transmitted by the reducer gear.

According to a further type of reduction gear consisting of parallel gears, the torquemeter operates as above illustrated, and both said systems known in the art show the disadvantage in that they will give an indication of the necessary torque with a very low approximation (10 percent about), owing to the fact that the friction which is present on grooved coupling will take up a major amount of power before permitting the axial movement of the moving elements.

According to another type of torquemeter reduction gear said trouble is partially surmounted, wherein the transmission of the torque indication occurs with an approximation of 2 percent about, however said type comprises a dual-stage of parallel gears, thus implying a relevant amount of supports and shafts, and accordingly a reduction gear with increased weight and dimensions.

According to the present invention, troubles as occurring with the prior art reduction gears are prevented, along with an important reduction in weight and dimensions of the other type known in the art, providing a reduction gear with torquemeter associated which comprises a single stage of helical gears, wherein the driven gear is axially associated at one side with a ball joint suitable to transmit the output torque and to permit axial motions only with a very limited rolling friction and at the other side associated with a piston axially running with a hydraulic cylinder in such a manner that the movements of said piston resulting from the variations of taken-up torque, will be converted into variations of hydraulic pressure which can be easily signalled through the known pressure detecting units.

The following description, given as an example of embodiment of a reduction gear with torquemeter according to the present invention, in particular suitable for helicopters, these and further features and advantages are illustrated, when read in conjunction with the accompanying drawing, wherein.

Figure 1:
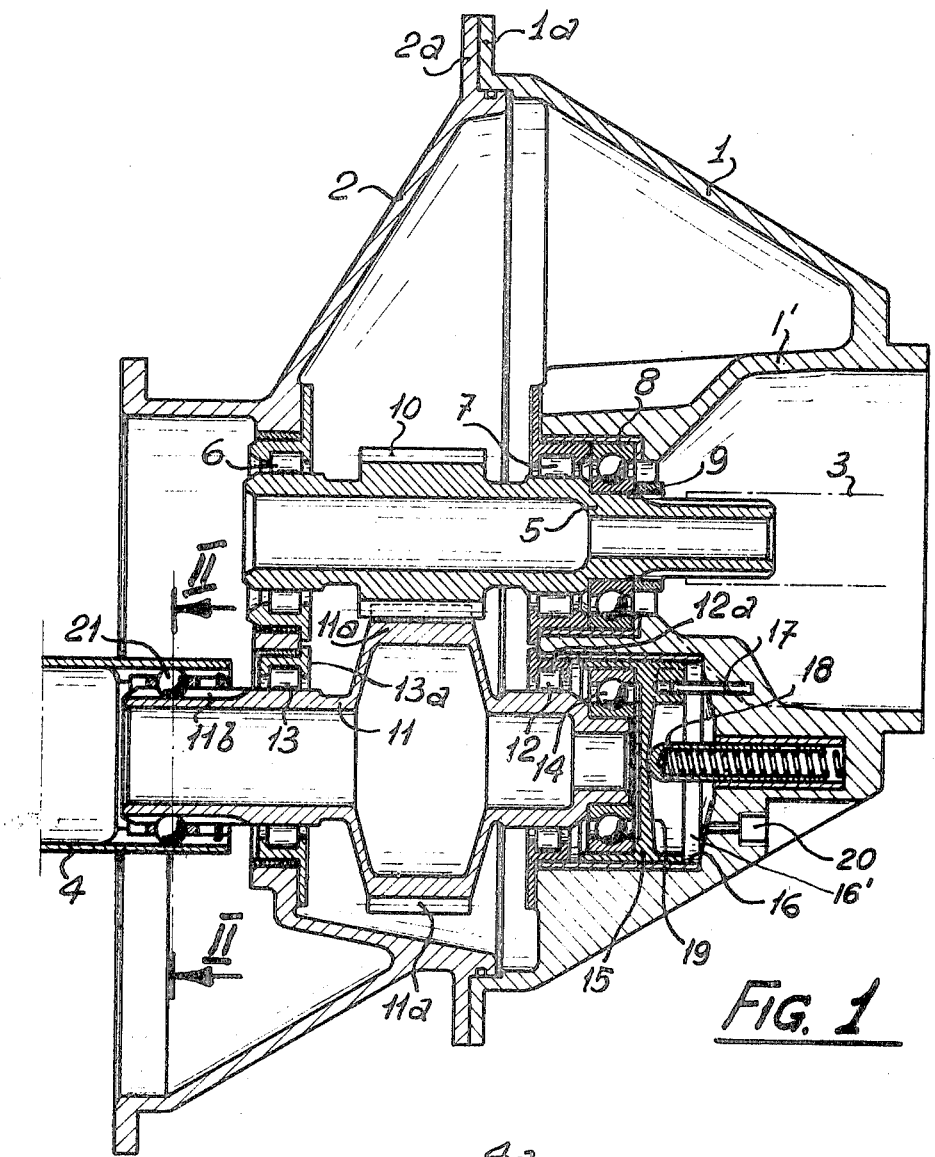
FIG. 1, is a longitudinal axial cross section of the entire unit.
Figure 2:
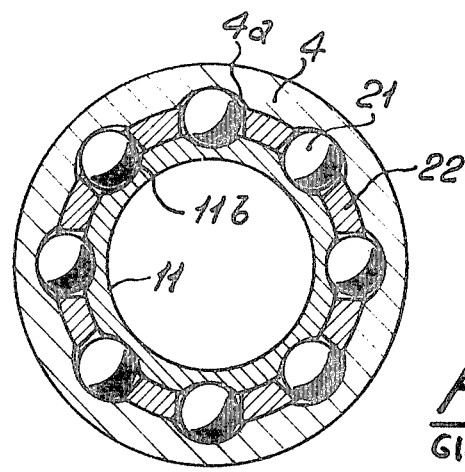
FIG. 2 is a detail view of the ball joint, taken on the line II—II of FIG. 1.

With reference to said figures, it will be appreciated that said reduction gear comprises a crankcase divided into two portions, 1, 2, connected one to the other by means of the flanges 1a, 2a, into which shaft 3 enters and driven shaft 4 extends therefrom. Said driving shaft 3 is integral when in rotation with the shaft 5 resting on said crankcase through radial bearings 6,7 and a bearing 8 with axial action, the latter being locked onto said shaft 5 by means of the ring nut 9. On said shaft 5 the pinion 10 is executed with helical gear which meshes with the wheel 11a executed or otherwise integral with the parallel shaft 11. The driven shaft 11 is supported by said crankcase 1–2 through radial roller bearings 12–13, which are locked thereon by means of the outer rings 12a–13a, while still permitting a free axial motion to the shaft 11 which represent the inner path of said bearings. At the right-hand end of said shaft 11, i.e., at the end according to which the axial component of the helical gear of the two gear-wheels 10 and 11a is directed, is provided a thrust-bearing 14 arranged between said end along with a piston 15 running into a cylinder 16 which is coaxial with said shaft 11. Said piston 15 is rotatory engaged by means of the pin 17 in a manner that it can run axially while it is prevented against rotation, and it is urged toward the gear 11a by means of the spring 18 acting axially against the center of the recess 19 executed on the piston crown.

A hole 20 executed on the bottom of said cylinder 16 will permit the coupling of the cylinder with detecting means or instrument (not shown). At the other side of the shaft 11 a ball joint is provided comprising the balls 21 sliding on grooves 11b and 4a, namely of the shaft 11 and 4, and guided through the cage 22. Said joint will permit the transmission of the torque according to rotary direction, still permitting the shaft 11 to run axially with only the rolling friction of balls 21 on opposite grooves 11b–4a. In operation, the shaft 3 will cause the pinion 10 to rotate, which latter entrains the crown 11a which in turn will transmit the motion to the shaft 4 through the balls 21. Owing to the presence of helical gearing, the shaft 11 is urged by the axial component to the right-hand side according to the torque transmitted, wherein said urging will move piston 15 which in turn compresses the fluid on the bottom of cylinder 16 thus balancing the axial thrust of the pressure of which is transmitted through conduit 20 to a proper apparatus. Thus, at any moment is allowed the value of the torque transmitted with a high approximation, since all axial resistances have been eliminated or reduced down, still having reduced to the minimum required the weight and the dimensions of the recution gear.

While the present invention has been shown in a preferred embodiment, it is quite clear that various modifications may be made, within the general scope of the invention.

I claim:

1. A transmission for transmitting torque from a driving shaft to a driven shaft, comprising
   1. an axially stationary transmission shaft connected to, and rotatable with, the driving shaft,
   2. a driving gear mounted on the axially stationary transmission shaft for rotation therewith,
   3. an axially displaceable transmission shaft connected at one end thereof to the driven shaft,
      a. the driven shaft being rotatable with the axially displaceable transmission shaft,
   4. a driven gear mounted on the axially displaceable transmission shaft,
      b. the driven gear meshing with the driving gear and being driven thereby, and
      c. the axially displaceable transmission shaft being rotatable and simultaneously axially displaceable by the driven gear upon rotation of the driving gear,
   5. a hydraulic cylinder-and-piston bearing coaxial with and supporting the other end of the axially displaceable transmission shaft,
      d. the other shaft end being rotatably journaled in the piston,
      e. the piston being axially slidable in the cylinder,
      f. the piston and the cylinder defining a cylinder chamber holding a hydraulic fluid under a pressure balancing the axial thrust resulting from the torque transmission, and
      g. a port leading from the cylinder chamber and receiving a pressure of the hydraulic fluid proportional to the torque.

2. The transmission of claim 1, wherein the two transmission shafts are parallel to each other, and the gears are helical to cause the axial displacement of the axially displaceable shaft upon rotation of the gears.

3. The transmission of claim 1, further comprising a ball coupling connecting the one end of the axially displaceable shaft with the driven shaft, the one shaft end extending into an end of the driven shaft, the interior wall of the driven shaft end and the exterior wall of the one shaft end defining axially extending grooves housing the balls whereby the balls frictionally transmit torque from the axially displaceable transmission shaft to the driven shaft while permitting the transmission shaft to be axially displaced against the rolling friction only of the balls moving in the grooves.

4. The transmission of claim 1, further comprising a thrust bearing between the piston and the other shaft end for rotatably journaling the other shaft end in the piston, the piston being held against rotation in the cylinder.

5. The transmission of claim 4, further comprising a spring coaxial with the piston and biasing the piston and the axially displaceable transmission shaft against the driven shaft.

* * * * *